Patented Apr. 29, 1930

1,756,818

UNITED STATES PATENT OFFICE

CARLETON ELLIS AND JOSEPH V. MEIGS, OF MONTCLAIR, NEW JERSEY; SAID MEIGS ASSIGNOR, BY MESNE ASSIGNMENTS, TO SAID ELLIS

CHEMICAL PRODUCT AND PROCESS OF PRODUCING SAME

No Drawing. Application filed September 2, 1919, Serial No. 321,183. Renewed July 22, 1929.

This invention relates to colloidal substances produced by a chemical reaction and also includes waxy and amorphous bodies so produced, whose properties are rather more crystalline than colloidal. The raw materials which are included within the scope of the invention are of a somewhat broad classification.

The products which are produced by carrying the invention into effect in its various phases and modifications are usually substances of a plastic, resinous and colloidal nature and may be used for example in the varnish, paint, leather, linoleum, insulation and allied industries. One of the objects of the invention is to produce resinous bodies which are light in color and which are in fact as nearly colorless as possible.

A further object of the invention is to produce resinous bodies which may be converted from a soluble and fusible condition into an insoluble and infusible state.

As combining or reacting agents the halides of sulphur have been found very effective with regard to a large variety of organic bodies particularly hydroxy aromatic bodies like phenol and its homologues naphthol and its derivatives and substances related to these bodies, may be used. Also basic aromatic bodies particularly tertiary amines including the di- and mono-alkyl substitution products of aniline for example dimethyl anilin may sometimes be used.

Wherever a reactive halide is used in the present invention as a means of reacting with aromatic bodies, it has been found that the corresponding hydro-halide acid is formed in large quantities and that also the amount of hydro-halide acid formed is equivalent to a very large fraction of the halogen contained in the reactive chloride in question.

It is therefore a further object of the invention so to carry out the reaction as to obtain the hydro-halide acid (that is to say hydrochloric, hydrobromic or hydriodic acid) in the most advantageous form.

Referring now more specifically to the reaction between the halides of sulphur and the phenolic or phenoloid body, it is noted that the reaction products may be divided in the particular case where the halides of sulphur are reacted with phenolic or phenoloid bodies into three main classes based on the properties of these classes.

Firstly, waxy substances. These bodies are produced especially in those cases where the number of reacting substances is reduced to a minimum that is to say where there are two reacting substances and where both are in a fairly high state of purity and the amount of sulphur halide used is limited as hereinafter described.

Secondly, substances produced as above by a limited quantity of combining agent (as halides of sulphur) and where the number of bodies entering into the chemical reaction are more than two. The result of this action is usually a body of a decidedly gel-like or colloidal consistency and ranges in firmness from a soft fluid viscous body to a hard resin.

Bodies produced in, and belonging to the two main classes just described are either completely or almost wholly soluble in alcohol, acetone and similarly acting solvents.

Thirdly, bodies produced by the action of an excess of a combining agent (as for example sulphur chloride or bromide) upon a phenolic or phenoloid body. These substances are generally insoluble in the common solvents and are also infusible, that is to say, instead of melting upon the application of heat they merely retain their form and gradually carbonize these bodies also having a non-crystalline or colloidal nature.

As hereinbefore stated it is the object of a part of the present invention to directly produce bodies whose color is as light as possible. For this purpose it is desirable and in some cases necessary to start with reacting substances which are of themselves free from extraneous coloring and color-yielding constituents for example if it be a question of using sulphur chloride as the agent with which to react upon a phenolic body it is in some cases desirable to give the sulphur chloride as it comes upon the market a treatment in two steps. First it is carefully redistilled in order to remove free sulphur. The distillate may then be given a treatment with fuller's earth, infusorial earth, calcium carbonate, or some equivalent substance which will remove extraneous coloring matter and preferably at the same time remove free hydrochloric and sulphurous acids. A process of this general character is described and claimed in a separate application of J. V. Meigs, now Patent No. 1,464,137. It is also desirable to purify the organic body to be acted upon by the sulphur chloride as much as possible for example if commercial cresylic acid is the substance which is being condensed it is desirable in many cases to redistill the latter until it is nearly colorless, and then to give this material also a treatment with a decolorizing agent as bone char, fuller's earth and the like. However even if the reacting substances have been purified as much as possible it will be found on bringing them together, at least as far as the production of a soluble product is concerned, that the reaction product will be more or less highly colored, a fact which is probably due in many cases to the rapidity with which the chemical reaction takes place. To avoid the production of a more or less highly colored body as indicated, it is preferable to modify the vigor of the chemical reaction by the use of a limited quantity of solvent. The amount of solvent is limited, first because when it is desirable to obtain hard, solid reaction products these cannot be obtained if the dilution proceeds beyond a certain point, and secondly because the use of a large amount of solvent renders the process too expensive. As solvents a large variety of bodies may be used and these may be divided into three classes, namely, hydrocarbons and their chlorinated derivatives, alcohols, or aqueous solutions for example sodium chloride solutions or water itself, or miscellaneous solvents like glacial acetic acid, aqueous acetic acid, ethyl acetate and the like. Or combinations of representatives of these three classes may be used. Again there are a number of different ways in which the reaction can be brought about for example the sulphur halide may be dissolved in a suitable solvent and added gradually to a solution of a phenoloid body, in its turn dissolved in a suitable solvent. Or this procedure may be reversed, the solution of phenoloid body may be gradually added to the solution of sulphur halide or still again the solution of the sulphur halide may be added all at once to the solution of the phenoloid body and vice versa. Still another method is that which consists in diluting the vapors of the reacting substances with an inert gaseous diluent for example carbon dioxide, carbon monoxide, nitrogen and the like. This may be carried out by mixing the diluted vapors in any suitable mixing device which is capable of being heated and cooled and provided with suitable means for collecting and recovering the reaction product.

As specific examples which indicate how the preferred embodiment of the invention may be carried into effect the following are given:

*Example 1.*—Straw colored cresylic acid, 20 parts by weight, was dissolved in benzol, 20 parts by weight. To this solution all at once was added a solution of 20 parts by weight of sulphur monochloride dissolved in 15 parts by weight of benzol. An extremely violent reaction followed, clouds of hydrochloric acid were evolved and a light-colored solution obtained. This light-colored solution was poured into hot water whereupon the benzol evaporated leaving a light yellow precipitate which solidified on cooling to a hard yellow resin soluble in alcohol and equivalent solvents.

*Example 2.*—Phenol crystals, 300 parts by weight, were dissolved in benzol, 350 parts by weight. Sulphur monochloride, 250 parts by weight, were also dissolved in 350 parts by weight of benzol. While the phenol solution was thoroughly agitated the sulphur monochloride solution was dropped into it gradually. A creamy white bulky precipitate formed which when dried and pressed yielded a solid white waxy substance soluble in alcohol, sodium hydroxide solutions and hot sodium carbonate solutions. This product was slightly soluble in hot water. The saturated hot water solution on cooling deposited crystals, white glistening plates melting at 140° C. These crystals may also be pressed under high pressure to yield a solid cake resembling stearic acid in its appearance.

*Example 3.*—To liquid carbolic acid containing about 8% of water was added gradually an equal weight of sulphur monochloride. The product was quite light colored and it appears that the presence of water is an advantage rather than a disadvantage.

*Example 4.*—To a mixture of equal parts of commercial straw colored cresol, alcohol, and water, we added an equal weight of sulphur monochloride. An extremely vigorous reaction took place and a solid resinous yellow reaction product separated. It is generally preferred however, although not absolutely essential, to use as diluents anhydrous organic solvents for example benzol, toluol, solvent naphtha, and the like or chlorinated derivatives of these or other hydrocarbons. Since, as will be hereinafter shown, the major part of the halogen in the sulphur halide is evolved in the form of its corresponding halogen acid it is always necessary to subsequently thoroughly purify the product from hydro-halide acid residues and traces. This may be accomplished by means of water or neutralizing agents, for example aqueous solutions or ant-acid material, either in the undissolved or dissolved condition. For example after the reaction has proceeded in benzol solution the resulting reaction mass may be treated with precipitated calcium carbonate by thorough agitation with the latter and by subsequent filtration to separate the ant-acid material from the benzol solution of the reaction product, or instead of using calcium carbonate as an ant-acid material pure water may be used to remove the acids from the reaction products. In other words the reaction product in benzol solution is treated with hot water whereupon the benzol evaporates or boils off and the hydro-halide acid goes into the aqueous layer which may be readily separated from the water-insoluble substance produced.

The examples given above refer to the production of a somewhat hard resin which however is also soluble in alcohol and similarly acting solvents. The following example shows how the invention is carried into effect to produce a reaction product which comes under the head of the first class hereinbefore mentioned, that is to say soft viscous resinous reaction products soluble in alcohol, acetone and similarly acting solvents.

*Example 5.*—To 618 parts by weight of commercial straw colored cresol in 790 parts by weight of benzol, were gradually added, 476 parts by weight of sulphur monochloride, equal to 77% based on the weight of cresol. The product was then poured into boiling water. The benzol was evaporated, the product when dried was a lemon colored soft resinous body.

The specific examples referred to above are concerned with the production of a soluble and fusible reaction product, however, it appears to be entirely (or principally) a question of the amount of sulphur halide (or like reactive agent) used, with respect to the mother substance, for example cresol, which determines whether the reaction product is soluble and fusible or insoluble and infusible. That is to say when a limited amount of reaction agent is used, for example when sulphur chloride, say in equal amount is used, the mother substance being for example cresol, then in general a soluble and fusible product is obtained. If however, a much larger quantity of sulphur chloride be used (say 1.4 times or greater) in this case then the product tends to become more and more insoluble and infusible. As a specific example of this phase of the embodiment the following is given:

*Example 6.*—2000 parts by weight of sulphur chloride dissolved in 2640 parts by weight of benzol were gradually added to 1000 parts by weight of cresol (97% straw-colored tar acids). The cresol solution was vigorously stirred during the reaction. A brown solution was obtained and a viscous precipitate. Washed this precipitate with several portions of benzol and found that on treating the precipitate with boiling water, it (the precipitate) became harder and did not melt in the boiling water. Thereupon the precipitate was heated on the hot plate and it was found that on heating in this way for fifteen to thirty minutes that the precipitate became infusible. It was also insoluble in alcohol or benzol. As first produced the product referred to was a thick viscous yellow mass. A portion was kneaded in alcohol to wash out HCl, the plastic mass was kneaded in running water and a product was obtained quite elastic on compression. When pressed to one-half its thickness on release it came back to the original shape.

The preferred embodiment of the invention consists therefore in causing a reaction to take place between a phenolic substance and a halide of sulphur, a limited amount of solvent being used so that the extreme vigor with which the reaction takes place in the very concentrated state is reduced but only reduced to a very limited extent. In other words the proportions are such that the reaction is still vigorous enough to produce organic gels, complex mixtures and colloidal substances, rather than the crystalline comparatively simple substances which are produced when the dilution during the progress of the reaction is considerable; and the purpose of such varying limited dilution is to obtain substances which have a much lighter color than those substances which are produced when the reaction is carried out in a very concentrated state as for example when the reaction takes place between a phenolic body and a halide of sulphur without any solvent being used. As an example of the reaction between a concentrated sulphur halide and a phenolic body the following is given:

*Example 7.*—Added gradually 10 parts by weight of sulphur monobromide to 10 parts by weight of 97% straw colored tar acids. The reaction was very similar to that occurring when concentrated sulphur chloride was used. Copious clouds of hydrobromic acid were evolved and a viscous resinous body produced.

Although it is preferred in the production of light colored products as hereinbefore described to start with products which in themselves are free from extraneous coloring material, and then to carry the reaction out so that the large amount of energy evolved is dissipated to a limited extent by the use of a very limited amount of solvent, it is also quite possible to effect an additional decolorization of the reaction products produced. For example when the reaction is carried out in an organic solvent the reaction product in solution in the solvent may be agitated with, or filtered through a column of, a color-removing material of the nature of bone black, fuller's earth or the like. Or the reaction product may be treated chemically so as to effect its further decolorization. Since the reaction products which fall under either the first or second class mentioned above are soluble in alkaline solution, decolorization may be effected by means of alkali hypochlorites. Or the alkaline solution of the reaction product may be made the anode portion of an electrolytic cell and submitted to an electrolytic color-removing operation, or the alkaline solution of the reaction product may be oxidized for example in alkaline solution of permanganate or other equivalent oxidizing agent.

In another modification of the invention instead of using a halide of sulphur alone this may be first mixed with any other reactive chloride for example nitrosyl-chloride, nitrosyl-bromide, sulphuryl-bromide, sulphuryl-chloride, phosphorus trichloride, phosphorus pentachloride, phosphorus oxychloride, chlorosulphonic acid, disulphuryl-chloride ($S_2O_5Cl_2$), sulphur oxytetrachloride ($S_2O_3Cl_4$), sulphur oxychloride ($S_2OCl_4$), chromyl chloride ($CrO_2Cl_2$), sulphur monoiodide, silicon oxychloride ($SiOCl_2$) and silicon chlorohydrosulphide ($SiSCl_2$). Or any of the above substances may be used singly or in combination to effect the desired reaction. Furthermore this modification of the invention is not limited to the use of phenols or phenoloid bodies. It includes the use of other bodies with which the reactive substances hereinbefore mentioned will react to give desirable products. As examples of such substances the sulphonic acids and their sodium salts, of benzene, naphthalene and anthracene, the amino derivatives of aromatic hydrocarbons and the N-substituted derivatives of such aromatic hydrocarbons as well as the higher unsaturated aliphatic bodies of the nature of unsaturated glycerides and fatty acids may be mentioned. Moreover the sodium salts of the phenols and phenoloid bodies may be used; as an example of this modified embodiment of the invention the following is given.

*Example 8.*—To 22½ parts by weight of sodium phenate which had previously deliquesced so that it was in solution to some extent, was added 22½ parts by weight of sulphur chloride. A very vigorous reaction took place. There was obtained a solid yellow resinous product.

As an example of the action of a mixture of inorganic halides on a phenolic body the following is given:

*Example 9.*—50 parts by weight refined cresylic acid were dissolved in 88 parts by weight of benzol and 30 parts by weight of stannic chloride were added. There was then added 50 parts by weight of sulphur chloride, a vigorous reaction took place. The product partly separated out. It was quite different from the kind of product produced when a sulphur halide alone is added to a phenolic body inasmuch as it was quite black in color and desirable only in those cases where a dark colored product is permissible. In addition to the use of the mixed chlorides or oxychloride there is also an advantage in this modified form of the invention in using a reactive chloride or oxychloride for example sulphur chloride in conjunction with a substance capable of esterification with the phenolic body. An example of such a substance is phosphoric acid or phosphorus acid. In this case the sulphur chloride in addition to exerting its own specific action on the phenolic body also acts as a dehydrating and esterifying agent. The following is an example of this particular phase of the modified form of the invention.

*Example 10.*—A mixture of 20 parts by weight of phosphoric acid and 20 parts by weight of phenol crystals was heated for some time to a high temperature. The reaction product solidified to a white solid on cooling. 20 parts by weight of sulphur monochloride was then added and the heating continued. The reaction product obtained was a very viscous almost solid yellow mass.

As hereinbefore described an important part of the invention consists in the recovery of the by-products or what may be considered as by-products. That is to say in the case where a halide of sulphur or other reactive halide is brought in contact with the substance which causes the evolution of the halogen of the reactive halide in the form of a hydro-halide acid, it is important to absorb or otherwise utilize this hydro-halide acid which may be looked upon under some circumstances as a by-product. As an example which goes to show that, for example, in the case of sulphur chloride its action upon cresol causes the chlorine in the sulphur chloride to be evolved as hydrochloric acid gas the following is given:

*Example 11.*—To a solution of 50 grams of cresol (97% tar acids) in 50 c. c. of benzol, in a flask, was added drop by drop, a solution of 50 grams of sulphur chloride in 50 c. c. of benzol. The hydrochloric acid gas evolved was absorbed in water and it was noted that the gas evolved was completely absorbed by the water (200 c. c. of water used). 50 c. c. of the resulting acid solution (as shown by titration with standard NaOH solution) contained 5.453 grams HCl. Therefore the total weight of HCl evolved and absorbed in this experiment was 21.8 grams. The sulphur chloride used contained 10% of free sulphur or the 50 grams of sulphur chloride used contained 45 grams $S_2Cl_2$. This would yield theoretically 24.3 grams of HCl, if the chlorine were all converted into HCl. Hence nearly 90% of the chlorine in the sulphur chloride was actually recovered in this experiment as hydrochloric acid. No evidence of any other acid gases except HCl was obtained, for example no hydrogen sulphide was evolved.

It may be noted that in this example, the free sulphur present did not prevent the reaction from taking place.

The use of water or aqueous solutions as a dispersing, extending and solvent medium is an integral part of the invention. In the case where the phenoloid body is wholly or appreciably soluble in water, the water acts as a direct solvent medium. It might be thought at first that water would be undesirable in this respect on account of its own specific action on sulphur chlorid and similar bodies. Nevertheless it has been found that a mixture of reactive phenolic body and water is acted upon by a reactive agent such as sulphur chloride, sulphur bromide or their equivalents in such a manner that the water in the presence of the reactive phenolic body is, for the most part, not decomposed by the sulphur chloride. Examples have already been given (see Examples 3 and 4 and Example 8 above) of the action of sulphur chloride on aqueous solutions that is direct solutions of phenolic bodies for example sodium phenate in water, and cresol dissolved in a mixture of alcohol and water. The phenolic substance in order to yield with for example sulphur chloride, need not however be in a state of direct solution so far as water is concerned when this is used as the dispersing and extending medium. That is to say the water and the phenolic or phenoloid substance, particularly when the latter is insoluble or relatively insoluble in water may be mixed and the mixture emulsified in any known suitable way, that is by the use of mechanical agitation or emulsifying agents or both. Sulphur chloride, when added to this suspension or emulsion of cresol in water will then be found to produce the desired reaction without any undesirable side reactions. Or the emulsion of the phenolic substance in water may be slowly added or added all at once to the desired quantity of sulphur chloride. One of the advantages of the use of water as an extending and dispersing medium is the fact that it appears to extract coloring matter from the resin and thereby produce light colored products. There is usually a certain rise in temperature of the reaction above room temperature unless special means are used to lower the temperature and it may be that the water in some way enters into the reaction and at the same time extracts coloring matter. At any rate it has been noticed that the aqueous layer at the close or conclusion of the reaction is quite dark, in fact much darker than can be obtained by boiling the above described reaction products with water. Moreover this darkening of the aqueous layer appears to correspond with an improved shade of color of the reaction product. So that from the point of view of obtaining light-colored products with the use of liquid reacting agents of the nature of sulphur chloride, water, as an extending and dispersing medium appears to have desirable effects. It also presents of course an advantage from the point of view of economy. Still another advantage in using water in this way is the fact that the hydrochloric acid evolved is immediately absorbed by the water which is in intimate contact with the hydrochloric evolved and in this way a solution of hydrochloric acid is produced simultaneously with the production of the colloidal product. By regulating the amount of water used it has been found possible to prepare hydrochloric acid solution which is practically saturated, that is to say a solution suitable for commercial use.

As a specific example of the use of water as hereinabove described the following is given:

*Example 12.*—A mixture of 200 parts by weight of straw colored cresol and 250 parts by weight of water was made. This mixture was placed in a bottle provided with an emulsifying agitator and the mixture of cresol and water was then emulsified mechanically. 200 parts by weight of sulphur monochloride was then run, in a thin stream, into the emulsion. (Previously the sulphur chloride had been carefully purified by redistillation, to remove free sulphur, and subsequent agitation and filtration with and through fuller's earth). A vigorous reaction took place and the mixture got hot. After all the sulphur chloride was added the mixture was allowed to settle and there was noted the production of three products. One, a lower layer of light colored resinous product. Two, a middle layer of aqueous solution colored quite dark. Three, a small amount of light colored resinous scum floating on the aqueous solution. A sample of the lower layer of resinous product was removed and it appeared to possess a very satisfactory light color. The small amount of scum floating on top of the water was not entirely (although partially) soluble in alcohol but the lower layer of resinous product was entirely soluble. No free sulphur was found in either layer. The aqueous layer was moreover practically saturated with hydrochloric acid.

In the preferred operation of the process, the phenoloid body (e. g. phenol, cresol, etc), is dissolved in an amount of solvent not exceeding, or not greatly exceeding the amount of the phenolic body. It is in fact advisable to employ not over two parts of the solvent to one part of phenol. Such an amount of solvent, as here indicated are herein styled "small amount".

*Example 13.*—To 300 parts by weight of commercial cresol at room temperature were added gradually 250 parts by weight of $S_2Cl_2$. The temperature of the reaction mixture steadily rose (from 24° C., initially) until all the sulphur chloride had been added when it was 79½° C. This action was more vigorous than in the case of ordinary phenol. The resulting product was extremely viscous and possessed a yellowish brown color. It was extracted for two hours with hot water and then blown with air at 130°–170° C. This product showed much less water-soluble material than the product formed by reacting on 300 parts of phenol with 185 parts of sulfur monochloride.

The proportions of sulphur chlorid to cresol can be varied substantially, (and elsewhere in this specification we have referred to using a modification of this example in whch 300 parts of cresol are treated with 250 to 300 of sulfur chlorid). However, for making the most satisfactory reaction products of these two materials which are completely soluble in alcohol, acetone and similar solvents, the ratio of the amounts of $S_2Cl_2$ to cresol should preferably not very greatly exceed seven to six.

We have in this case referred to two general modes of operation for the production of light colored products, viz: (a) employing material which are substantially free from color-forming impurities or carrying out the reaction in an aqueous vehicle, to directly produce a light colored product, and (b) employing materials in a somewhat crude condition, without any large amounts of water present, whereby a dark colored resin is formed, and subsequently bleaching the latter. The first of these modes is more particularly claimed herein, and the second is claimed in a copending case, Ser. No. 344,871, filed Dec. 15, 1919, in which the bleaching is more fully described.

In still another phase of the invention carbonyl chloride or phosgene gas is used as the agent with which to react upon phenolic bodies. In this case the phenolic body in either the concentrated or diluted condition is fully saturated with the phosgene gas with or without the employment of pressure, and preferably at a low temperature to facilitate the absorption. The reaction mass is then gradually heated to complete the reaction, the reaction product separated from its mother substance or substances, if necessary, washed and dried.

In recapitulation, the invention is concerned with the production of colloidal resinous bodies and other useful substances by the reaction between reactive inorganic and organic chlorides and substances with which these chlorides will readily react to produce useful products chief among these organic mother substances are the phenols and their homologues and derivatives. The reaction is carried out in the presence of a limited amount of dispersing and extending media in order to obtain products which possess an improved color and by regulating the amount of reactive chloride with respect to the weight of mother substance, colloidal resinous bodies are produced which range in consistency from a soft viscous body which will flow at ordinary temperatures to the intermediate stage of a hard resin which is soluble and fusible and finally to the ultimate products which are produced by an excess of reactive chloride or other condensing agent upon the mother substance or phenoloid body. And finally the invention includes the cognizance and recovery in a permanent and utilizable condition of the by-products of value produced by the chemical reaction or reactions hereinabove described, particularly the recovery and utilization of hydrochloric, hydrobromic and hydriodic acids.

In the foregoing specification and in the following claims the term hydro-halide is, so far as this invention is concerned, a general term which is meant to characterize the combination of a halogen with hydrogen, that is to say hydrogen chloride, hydrogen bromide, hydrogen iodide etc.

The present application is a continuation in part (especially as regards the reaction of hydroxy aromatic bodies with sulfur halids) of our copending application 313,820, filed July 28, 1919.

What we claim is:

1. The process of making a colloidal, plastic product which consists in contacting an inorganic chloride of a metalloid element, in admixture with a diluent, with a substance comprising a phenolic body capable of reacting upon such chloride to resinification, the ratio of the weight of such chloride to that of the phenolic body being not less than the molecular ratio of 71:94.

2. The process of making a resinous substance which consists in bringing a reactive chloride of a metalloid element into intimate contact with a body comprising a reactive phenolic substance, in the presence of another substance which itself is reactive toward the phenolic substance.

3. A process which comprises reacting upon a phenolic body with a reactive halide of a metalloid element to form a resinous body, and removing at least a substantial part of the color produced in the formation of said resinous body.

4. The process of making a sulfuretted phenol product which comprises reacting upon an aromatic substance with sulfur halide, free sulphur being present in the sulfur halide used.

5. A process which comprises reacting on a phenol with sulfur chlorid in the presence of water.

6. A process which comprises reacting upon a phenol with sulfur monochloride in the presence of such an amount of water as to produce a resinous product and hydrochloric acid solution of commercial strength.

7. A plastic gum capable of hardening under heat treatment consisting of a reaction product of a chloride of sulphur and a homologue of phenol.

8. A plastic reaction product of a chloride of sulphur and a homologue of phenol, adapted to harden gradually under heat treatment into a substantially infusible body.

9. A reaction product of a chloride of sulphur and a phenol, which is capable of being hardened without addition of any chemical hardening agent.

10. A plastic material capable of being hardened without addition of any chemical hardening agent, consisting of a reaction product of a chloride of sulphur and cresol.

11. The process of producing from a chloride of sulphur and a homologue of phenol a plastic product capable of being hardened without addition of any chemical hardening agents, which comprises bringing said compounds into intimate contact through adding one compound slowly and in small portions to the other, maintaining such intimate contact until reaction ensues and during progress of such reaction and heat treating the product resulting from such reaction.

12. A resinous reaction product of sulphur chloride and an aromatic body, such aromatic body being characterized by its ability to form a resin with sulphur chloride, and the reaction product being formed in the presence of free sulphur.

13. The process of producing a resinous product which comprises simultaneously reacting in the presence of sulphur, with sulphur chloride on an aromatic body capable of forming therewith a sulphur resin.

14. The process of making a reaction product which consists in maintaining a phenolic body in a liquid condition in the presence of a liquid extending agent, and adding thereto liquid sulfur monochloride, the amount of the latter being at least as great as the amount of the former.

15. The process of making a resin which consists in maintaining a body of phenol in a liquefied condition in the presence of a diluent liquid, adding more than an equal weight of sulfur chloride, maintaining the reaction product in a liquefied condition and passing steam into the same.

16. A process of making a resin which comprises adding to one part of a phenol in the presence of a liquid vehicle which is chemically inert to said phenol, in quantities computed for one part of $C_6H_5OH$, substantially more than one part of sulphur chloride, and purifying the resinous material formed.

17. A process of making a resin which comprises maintaining an amount of a single 6-carbon ring phenol corresponding molecularly to 1 part $C_6H_5OH$, in a liquid condition in the presence of a liquid reaction vehicle which does not take part in the reaction, gradually adding more than one part of sulfur chloride thereto, maintaining the reaction product in a liquid condition and passing a hot gaseous purifying agent into contact with the same.

18. The process of making a resin product which comprises reacting on cresol with sulphur chloride, the amount of the latter being sufficient to react with the major part at least of the cresol, with the formation of resinous products.

19. A light colored resinous body comprising the reaction products of cresol and sulphur chloride.

20. A resinous body comprising the reaction products of a phenol containing not over seven carbon atoms, and sulphur chloride, such resin being of a light color.

21. A resinous body comprising a light colored reaction product of a phenol and sulphur chloride as its only resinous constituent.

22. A resinous body comprising the light colored reaction products of cresol and sulphur monochloride.

23. A process of making a resin product which comprises reacting upon 100 parts of cresol with a sulfur halide corresponding in amount from 120 to 160 parts of sulfur monochloride, completely removing the hydrohalide acid from the resinous product.

24. A resinous body comprising the reaction product of cresol and a sulphur halide in about the proportions of one part of cresol to sulphur halide corresponding in amount to not less than one part of sulphur monochloride and being devoid of harmful quantities of mineral acid, said resin being dissolved in an alcoholic solvent.

25. A resinous body comprising the reaction products of cresol and sulphur chloride, the resin being free from mineral acid.

26. A sulphur-containing resin adapted for use as a substitute for shellac which comprises a cresol sulphur chloride resin of the character herein described soluble in approximately its own weight of an alcoholic volatile solvent.

27. The process of making cresol resin which comprises reacting on cresol with sulphur monochloride in the presence of water, withdrawing the major proportion of the aqueous hydrochloric acid produced and neutralizing the last traces of the mineral acid contained in the resin.

28. A resinous body comprising the reaction products of cresol and sulphur chloride, the resin being substantially free from corroding action on metals, such product being soluble in an alcoholic solvent in about the proportions of 1 to 1.

29. An organic sulphide resin substantially free from mineral acid.

CARLETON ELLIS.
JOSEPH V. MEIGS.